United States Patent [19]

Sato et al.

[11] 4,381,668
[45] May 3, 1983

[54] GAS FLOW MEASURING APPARATUS

[75] Inventors: Kanemasa Sato; Sadayasu Ueno; Kazuhiko Miya; Yoshishige Oyama; Yutaka Nishimura, all of Katsuta, Japan

[73] Assignee: Hitachi, Ltd., Tokyo, Japan

[21] Appl. No.: 178,597

[22] Filed: Aug. 15, 1980

[30] Foreign Application Priority Data

Aug. 22, 1979 [JP] Japan ................ 54-105899

[51] Int. Cl.$^3$ .................... G01F 5/00; G01F 1/68; G01F 1/22
[52] U.S. Cl. .................... 73/202; 73/204; 73/861.52; 73/861.63; 73/861.53
[58] Field of Search .................... 73/202, 204, 861.53, 73/861.63, 861.64, 861.52, 203

[56] References Cited

U.S. PATENT DOCUMENTS

| 1,827,813 | 10/1931 | Hill | 73/861.63 X |
|---|---|---|---|
| 1,870,849 | 8/1932 | Hodgson | 73/202 |
| 2,243,252 | 5/1941 | Huxford et al. | 73/202 |
| 3,559,482 | 2/1971 | Baker et al. | 73/204 |
| 3,603,148 | 9/1971 | Rikuta | 73/202 X |
| 3,688,576 | 9/1972 | Obermaier et al. | 73/202 |
| 3,824,966 | 7/1974 | Schneider et al. | 123/32 AE |
| 4,232,549 | 11/1980 | Migrin | 73/202 |
| 4,279,146 | 7/1981 | Wessel et al. | 73/204 |

FOREIGN PATENT DOCUMENTS

| 1192649 | 10/1959 | France | 73/202 |
|---|---|---|---|
| 285994 | 2/1928 | United Kingdom | 73/202 |
| 514376 | 11/1939 | United Kingdom | 73/202 |

Primary Examiner—Anthony V. Ciarlante
Assistant Examiner—David V. Carlson
Attorney, Agent, or Firm—Antonelli, Terry & Wands

[57] ABSTRACT

An intake barrel connected to an intake pipe of an internal combustion engine is provided therein with a venturi member. Openings are formed in the wall of the intake barrel at the upstream and downstream sides of the venturi member. A bypass passage forming member provided with a groove of a length greater than the distance between said openings is fixed to the outside of the intake barrel. A bypass passage is formed by these openings and the groove. A spacer is interposed between the intake barrel and the bypass passage forming member. The cross-sectional area of the bypass passage can be varied by varying the thickness of the spacer.

13 Claims, 1 Drawing Figure

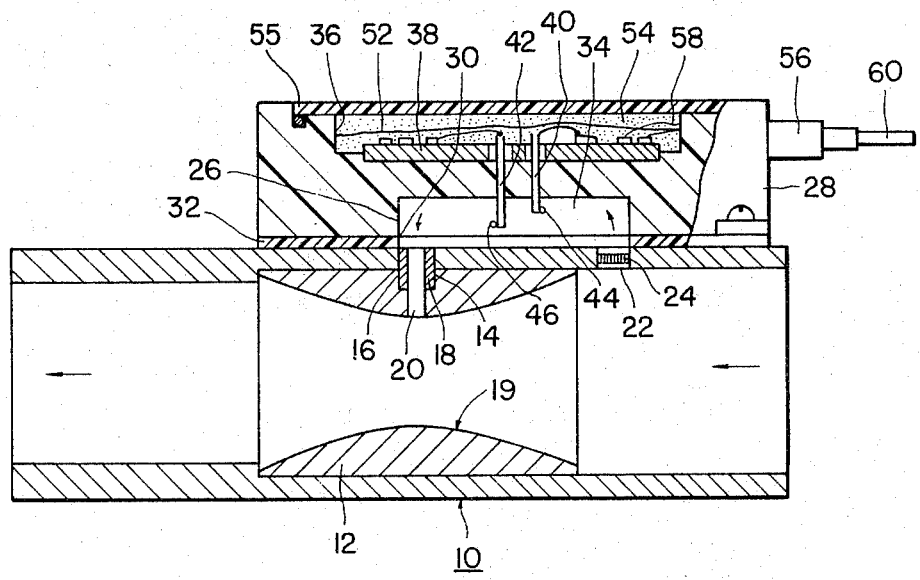

GAS FLOW MEASURING APPARATUS

BACKGROUND OF THE INVENTION

The present invention relates to a flow measuring device and, more particularly, to an apparatus for measuring the flow rate of a gas.

An air flow measuring apparatus having a heat generating resistance body such as a platinum wire mounted in a path of air flow by means of an attachment is known from the specification of U.S. Pat. No. 3,824,966 issued to Schneider et al. on July 23, 1974. This air flow measuring apparatus suffers, when used as an air flow measuring apparatus for measuring the intake air flow rate in an internal combustion engine, that the wire is burnt out or deteriorated due to the reverse flow of gas in the event of a back fire and, accordingly, has a poor durability. In addition, the adjustment of the tension of the wire is extremely difficult. Namely, if the tension is excessively large, the wire becomes more liable to be broken. To the contrary, a too low tension inconveniently permits the wire to be vibrated to cause a degradation of the precision of measurement.

The U.S. Pat. No. 3,559,482 granted on Baker et al on Feb. 2, 1971 proposes to dispose an air flow measuring apparatus in a bypass passage between an opening disposed at a portion of the air intake passage downstream from a venturi and an opening formed at a portion of the same upstream from the venturi. This air flow measuring apparatus is superior in that it can shelter from the reversing flow of gas in the event of back fire and that the installation of the air flow measuring apparatus is comparatively easy. In addition, the size of the apparatus can be made considerably small.

These known air flow measuring apparatus, however, involve a common disadvantage that the detection or measuring characteristic is determined by the construction of the air passage or the bypass passage and the calibration characteristic cannot be altered easily.

For instance, when these known air flow measuring apparatus are applied to engines having different capacities, it is necessary to modify the shape and construction of the air passage or the bypass passage and, in addition, to partially modify the arrangement of the platinum wire and the circuit arrangement.

SUMMARY OF THE INVENTION

It is, therefore, an object of the invention to provide an air flow measuring apparatus easily adjustable for different measuring characteristics and, hence, suitable for a mass-production.

To this end, according to the invention, there is provided an air flow measuring apparatus comprising a bypass passage forming member fixed to the outer periphery of an intake barrel which forms a main intake air passage with a spacer interposed therebetween, said bypass passage forming member being provided with an elongated groove so that bypass passage is formed between said bypass passage forming member and said intake barrel, and a flow meter interposed in said bypass passage.

BRIEF DESCRIPTION OF THE DRAWINGS

The attached sole FIGURE is a longitudinal sectional view of an embodiment of the invention.

DESCRIPTION OF THE PREFERRED EMBODIMENTS

Referring to the drawings, an intake barrel 10 is a stepped cylindrical member the inside diameter of which is greater at the upstream side than at the downstream side thereof. A venturi member 12 is inserted into the intake barrel from the upstream side end of the latter, and is fixed to the inside of the intake barrel 10 by means of a pipe 18 which is driven into an opening 14 formed at the outside of the central portion of the venturi member 12 and an opening 16 formed in the wall of the intake barrel 10 at a portion of the latter confronting the opening 14. An opening 20 is formed at the narrowest throat portion 19 of the venturi member 12 so as to communicate with the pipe 18. An opening 22 is formed in the wall of the intake barrel 10 at a portion of the latter upstream from the venturi member 12. The opening 22 and the opening 20 in the venturi member 12 are located on a line parallel to the central axis of the intake barrel 10. The opening 22 is provided with a filter 24.

A bypass passage forming member 28 made of a synthetic resin and provided with a rectangular groove 26 of a length greater than the distance between the openings 20,22 is fixed to the outside of the intake barrel 10. A spacer 32 made of a synthetic resin is placed between the bypass passage forming member 28 and the intake barrel 10. The spacer 32 is provided with a rectangular bore of a size equal to that of the groove 26. The openings 22 and 20 are communicated with each other to form a bypass passage 34.

A circuit board 38 is accommodated by a recess 36 formed in the bypass passage forming member 28 so as to oppose to the groove 26.

Two sets of support pins 40,42 extending through the central portion of the bypass passage forming member 28 are connected at their one ends to the electronic parts of the circuit board 38, while the other ends of the same are connected to a flow rate sensor 44 and a temperature compensation sensor 46. The flow rate sensor 44 is a resistance member whose resistance value is varied at a high sensitivity in response to a change in the flow rate, while the temperature compensation sensor 46 is a resistance member whose resistance value depends on the air temperature irrespective of the air flow rate. Although not shown, the flow rate sensor 44 and the temperature compensation sensor 46 are connected to two sides of a bridge circuit formed on the circuit board 38.

The circuit board 38 is coated with an anti-humidity insulating material 52 so that the electric insulating performance thereof is much improved. The recess 36 is filled with an insulating filler 54 and is then sealed by means of a cover 55.

A connector 56 provided at the outside of the bypass forming passage 28 is connected to a terminal 58 so as to supply the bridge circuit on the circuit board 38 with the required electric power. Thus, an air flow meter is formed on the bypass passage forming member 28 by means of the flow rate sensor 44, temperature compensation sensor 46 and the circuit board including the bridge circuit.

The level of vacuum generated around the opening 20 of the venturi member 12 is changed in accordance with the change of flow rate of air passing the intake barrel 10. Accordingly, the velocity of air flowing through the bypass air passage 34 is changed. The change of the velocity of air is detected by the flow rate sensor 44 and the temperature compensation sensor 46 which are connected in a bridge, and an electric output corresponding to the flow rate of air flowing through the intake barrel 10 is derived from the output terminal 60. This principle of operation is disclosed in, for example, the specification of U.S. Pat. No. 3,824,966.

The intake barrel 10 is communicated at its downstream side end with the combustion chamber of the engine through the throttle valve chamber and the intake pipe. A fuel injection valve is disposed at a portion of the throttle valve cahmber downstream from the throttle valve. The operation of the fuel injection valve is controlled in relation to the output signal derived from the output terminal 60.

In the described embodiment, the flow meter is less liable to be affected by the reversing flow of gas, even when a back fire happens to take place, partly because the openings 20,22 of the bypass air passage 34 are sufficiently small and partly because these openings are arranged at a right angle to the intake passage, so that the erroneous measurement of the air flow rate is avoided. Since the bypass passage forming member 28 is made of a synthetic resin having a low thermal conductivity, the temperature of air flowing through the by-pass passage 34 is never changed. The stabilization of the air temperature in turn suppresses the density of air to ensure a precise measurement of the air flow rate.

In addition, since the venturi member 12 and the spacer 32 are replaceable, the air flow measuring apparatus of the invention can apply to engines of different capacities. Namely, when the air flow measuring apparatus is applied to an engine having a larger capacity, the venturi member 12 is replaced with another venturi member having a larger cross-sectional area of passage and the spacer 32 is replaced with another spacer having a greater thickness. By so doing, the cross-sectional area of the bypass air passage 34 is increased to lower the flowing velocity of air flowing therethrough to magnify the measureable range of the intake air flow rate. In consequence, the intake barrel 10 and the bypass passage forming member 28 are commonly used for various capacities of engine, so that the measuring apparatus can suitably be mass-produced and the efficiency of assembling of the air flow meter is improved.

What is claimed is:

1. An apparatus for measuring the flow of a gas comprising:
   a main supply path member through which said gas flows, said main supply path member having first and second openings formed in the wall thereof and spaced by a predetermined distance in the direction of flow of said gas;
   a restrictive element disposed in said main supply path member between said first and second openings;
   a bypass member detachably fixed to the outside of said main supply path member and provided with an elongated groove, said elongated groove being communicated at its one end with said first opening and at its other end with said second opening, said groove delimiting a predetermined cross-sectional area;
   a spacer interposed between said main supply path member and said bypass member and provided with an opening corresponding to said groove of said bypass member, the opening of said spacer delimiting a cross-sectional are cooperating with said groove so as to vary the cross-sectional area of said groove in accordance with the thicknesss of said spacer; and
   a gas flow meter including a pair of resistance members exposed to the inside of said groove of said bypass member.

2. An apparatus for measuring the flow rate of a gas as claimed in claim 1, wherein said restrictive element is adapted to maintain a higher pressure at said first opening than at said second opening, and said groove extends in the direction of gas flow between said byapss member and the outside surface of said main supply path member, said groove having a length greater than the length between said first and second openings.

3. An apparatus for measuring the flow rate of gas comprising:
   a main supply path defined by a cylindrical member having a greater inside diameter at the upstream side than at the downstream side thereof and through which said gas is made to flow, the large diameter portion of said main supply path being provided with first and second openings formed in the wall thereof, said first and second openings being spaced from each other by a predetermined distance in the direction of flow of said gas;
   a venturi member fitted in the large diameter portion of said main supply path and provided at its throat portion with a third opening communicated with said second opening;
   a bypass passage forming member fixed to the outside of said main supply path and provided with an elongated groove, said groove being communicated at its one end with said first opening and at its other end with said second opening, said groove delimiting a predetermined cross-sectional area;
   a spacer interposed between said main supply path and said bypass passage forming member and provided with a fourth opening corresponding to said groove of said bypass passage forming member, the fourth opening of said spacer delimiting a cross-sectional area cooperating with said groove so as to vary the cross-sectional area of said groove in accordance with the thickness of said spacer; and
   a hot wire sensor including first and second resistances exposed to the inside of the groove of said bypass passage forming member.

4. An apparatus for measuring the flow rate of a gas as claimed in claim 3, wherein said groove extends in the direction of gas flow between said bypass passage forming member and the outside surface of said main supply path, said groove having a length greater than the distance between said first and second openings.

5. An apparatus for measuring the flow rate of a fluid comprising:
   a main supply path through which the fluid flows, said main supply path having first and second openings formed in the wall thereof and spaced by a predetermined distance in the direction of flow of the fluid;
   restricting means adapted to be disposed in said main supply path between said first and second openings;
   a bypass member fixed to the outside of said main supply path and including means forming a fluid flow bypass passage, said fluid flow bypass passage means including an elongated groove, said elongated groove being communicated at its one end with said first opening and at its other end with said second opening for enabling fluid flow therethrough;

means adapted to be interposed between said main supply path and said bypass member for enabling varying of the velocity of the fluid flowing through said fluid flow bypass passage means, said means for enabling varying of the velocity of the fluid being a spacer having an opening corresponding to said groove and cooperating with said groove so as to vary the cross-sectional area of the bypass passage in accordance with the thickness of said spacer; and a fluid flow meter including a pair of resistance members exposed to the inside of said groove of said fluid flow bypass passage means.

6. An apparatus for measuring the flow rate of a fluid as claimed in claim 5, wherein said restricting means maintains a higher pressure at said first opening than at said second opening, said groove extending between said bypass member and the outside surface of said main supply path, said groove having a length greater than the length between said first and second openings.

7. An apparatus for measuring the flow rate of a fluid as claimed in claim 5, wherein the fluid is a gas.

8. An apparatus for measuring the flow rate of a gas as claimed in claim 1 or claim 7, characterized by further comprising a filter disposed in said first opening of said main supply path member.

9. An apparatus for measuring the flow rate of a gas as claimed in claim 1 or claim 7, wherein said bypass member and said spacer are made of synthetic resins.

10. An apparatus for measuring the flow rate of a gas as claimed in claim 1 or claim 7, wherein the pair of resistance members of said gas flow meter includes a flow rate sensor resistance and a temperature compensation resistance exposed to the inside of said groove of said bypass member.

11. An apparatus for measuring the flow rate of gas as claimed in claim 10, said gas flow meter includes a bridge circuit, two sides of which being constituted by said flow rate sensor resistance and temperature compensation resistance.

12. An apparatus for measuring the flow rate of a gas as claimed in claim 1 or claim 7, wherein the opening of said spacer is of a size equal to that of said groove.

13. An apparatus for measuring the flow rate of a gas as claimed in claim 1 or claim 7, wherein said pair of resistance members are offset with respect to one another in a direction transverse to the direction of gas flow.

* * * * *